Patented Apr. 28, 1942

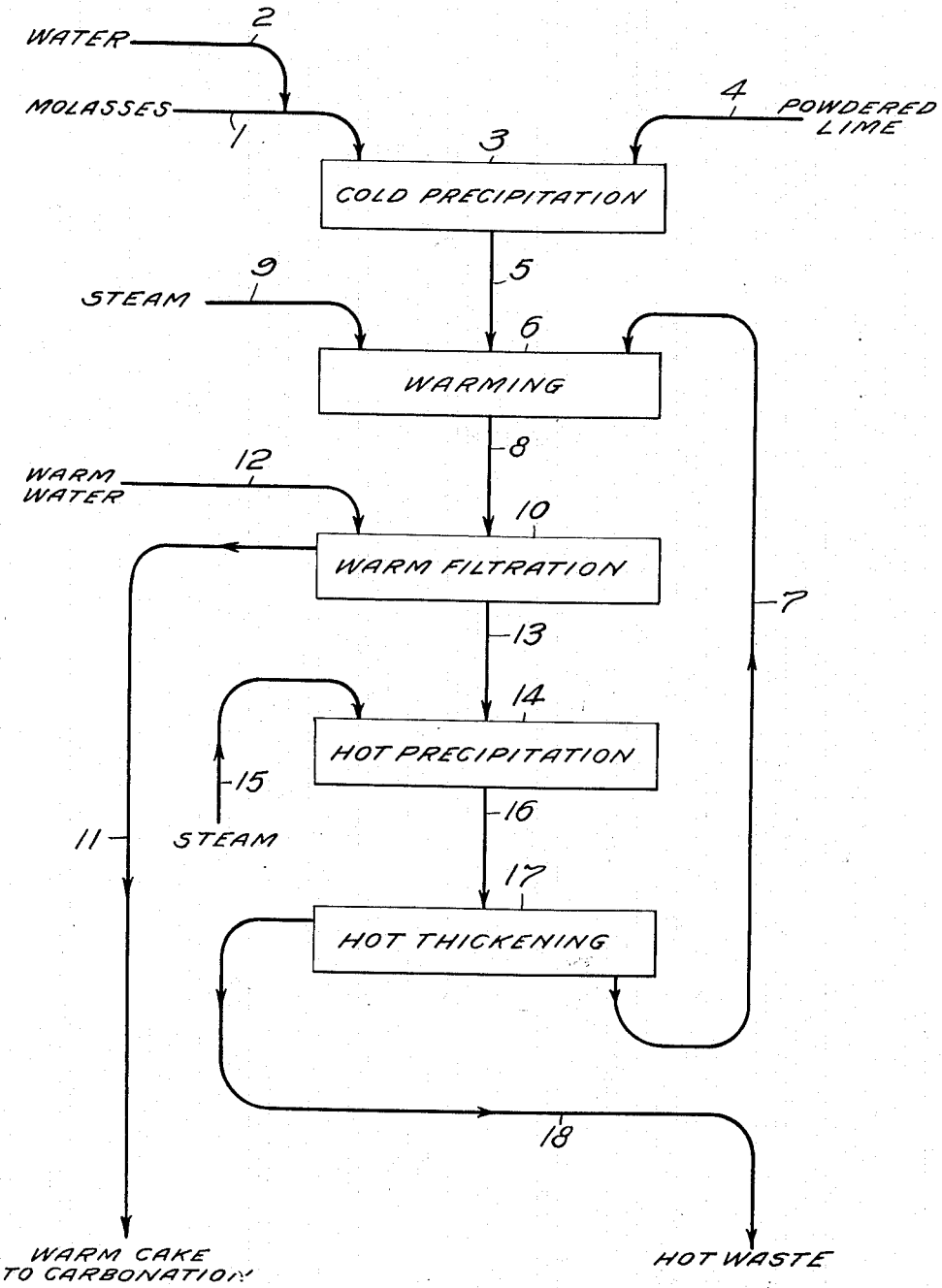

2,281,025

UNITED STATES PATENT OFFICE 2,281,025

RECOVERY OF SUGAR FROM MOLASSES

Roy H. Cottrell and Vernal Jensen, Ogden, Utah

Application October 27, 1936, Serial No. 107,794

2 Claims. (Cl. 127—47)

This invention relates to methods for recovering sucrose from sugar-beet molasses. More specifically it revolves about improvements in that procedure which is usually designated as the Steffen process wherein quicklime (CaO) is employed to effect the precipitation into substantially insoluble form of the sucrose content of a molasses solution and the precipitate subsequently separated from its mother-liquor.

One of the objects of the present invention is to simplify the operations involved in such treatment.

Another object is to provide an improved method for recovering sucrose from molasses which is more efficient and economical than those heretofore practised and, at the same time, which may be carried out by the use of less apparatus equipment than has heretofore been possible.

Another object is to effect the recovery of a larger proportion of sugar in marketable form than has heretofore been accomplished.

A still further object of the invention is to provide a method wherein all of the above advantages are realized and in which a lesser quantity of lime is required to recover a unit weight of sugar.

In a general way the Steffen process, as heretofore practised, comprises two groups of steps. The first of these includes the precipitation of so-called cold saccharate and its subsequent separation, as by filtration, from its cold mother-liquor. The second includes the precipitation of so-called hot saccharate from the cold mother-liquor resulting from the first separation step and the subsequent separation, as by filtration or decantation and filtration, of the hot saccharate from its hot mother-liquor, commonly termed hot waste liquor, which is discarded from the system substantially devoid of sucrose content.

In practising the Steffenizing operation it is customary to dilute the molasses, which usually contain approximately 50% sucrose and 83% total dry substance, with water to produce a solution containing substantially 5% to 8% sucrose frequently referred to as solution for cooler. The temperature of this solution is then lowered to a point within the range of substantially from 12° to 17° C. The temperature having been thus adjusted, powdered quicklime (CaO), substantially all minus 200 mesh, is added to the solution in incremental amounts up to a total sufficient to precipitate substantially 90% of the sucrose content of the mixture. During the addition of lime the mixture is maintained in a state of agitation and its temperature is kept within the range of from 12° to 17° C. The resulting mixture of precipitated cold calcium saccharate and mother-liquor, frequently termed solution from cooler or finished cooler solution, having a temperature substantially within the range of from 12° to 17° C., is subjected to a separation operation, as by filtration, so as to produce a filter-cake containing the precipitated cold calcium saccharate which, after washing with cold water, is largely free from mother-liquor, and a solution substantially free from suspended precipitate, sometimes referred to as cold waste water, which is subjected to further treatment as hereinafter described.

The cold water waste from the foregoing group of steps usually contains substantially .5%, on solution, of sucrose and an alkalinity equal to substantially .7 gm. of CaO per 100 cc. of solution. Customarily it is heated to a temperature of from 85° to 87° C. with the result that a second precipitate of calcium saccharate, usually termed hot saccharate precipitate, is formed. The resulting mixture of hot precipitate and hot mother-liquor is then subjected to a separation operation, as by filtration or decantation and filtration, the temperature being maintained within the range of substantially from 80° to 87° C. This operation produces a sugar-containing hot saccharate filter-cake which is washed with warm water so that it is substantially free of mother-liquor, and a filtrate comprised of the hot mother-liquor or, as it is sometimes termed, hot waste water. This liquid is now substantially exhausted of recoverable sucrose content and is discarded from the system.

The foregoing describes the Steffen process as it is generally practised where both groups of steps, the cold precipitation and the hot precipitation, are carried out. Some installations dispense with or are not equipped for the hot precipitation stage and run the cold waste water to sewer, perhaps using part of it for diluting the original molasses. In that event the major part of the sucrose content of the cold waste, of course, is lost.

In connection with the cold precipitation stage if the precipitation were effected at temperatures below the hereinbefore prescribed range, i. e. below 12° C., less reagent (CaO) would be required but a less effective separation would result. This may be due to the fact that the higher viscosity of the mixture makes it difficult to filter, or to other reasons not readily understood. Furthermore, if the precipitation were effected at temperatures in excess of the prescribed range, i. e., above 17° C., a more effective separation is attainable but more reagent (CaO) is required. The specified temperature range, therefore, represents the conditions under which the operation is most economically effected.

In practising the hot precipitation process of the Steffens operation if the cold waste water is not heated to temperatures above substantially 85° C. a maximum of precipitate will not be produced. Furthermore, if the mixture, having been sufficiently heated to obtain a satisfactory precipitate, be allowed to cool to temperatures below substantially 85° C. there occurs a dissolution of precipitate with a corresponding lessening of efficiency.

The present invention, in addition to simplifying the above described Steffenizing operations, accomplishes some of its objects in the following general manner. In the recovery of cold saccharate precipitates, according to an embodiment of this invention, the cold precipitation is effected at temperatures below substantially 12° C., thereby obtaining a desired precipitation of cold saccharate and, at the same time, making possible a material reduction in the amount of lime required over former practice. Thereafter the separation, as by filtration, is effected at temperatures in excess of the generally prescribed range, i. e., above substantially 17° C., thereby obtaining a more effective separation. It is found that filtration in the range above 17° C. yields a filter-cake containing less impurities per pound of sugar in the cake, and this necessarily yields an increase in the proportion of sugar recovered in marketable form. Contrary to general belief it is discovered, as a part of this invention, that heating the mixture of cold saccharate precipitate and cold mother-liquor to filter it at temperatures above the normally prescribed range does not cause a dissolution of the precipitate or exert any deleterious effect whatever.

Still further advantages of the present invention are realized in a system for the recovery of both the cold and hot precipitates. In this embodiment the hot saccharate precipitate, in the form of a thickened sludge, is added to the finished cooler solution, i. e., the mixture of cold precipitate and cold mother-liquor. The heat of the hot sludge will raise the temperature of the resulting mixture to that desired, which is above substantially 17° C. and the mixture is then filtered obtaining a cake composed of both the cold and hot calcium saccharate precipitates, thus eliminating the usual step of separately filtering the hot precipitate. The filtrate from this filtration step is a solution which is substantially free from suspended precipitate but which contains substantially .5 gm. of sucrose and an alkalinity equivalent to substantially .7 gm. of CaO per 100 cc. This solution is heated, as hereinbefore described, to precipitate the hot calcium saccharate. The resulting mixture is subjected to a thickening operation, as by decantation, to obtain a sludge comprising all of the hot precipitate and a portion of the hot mother-liquor which sludge is added to the finished cooler solution as above described, and a hot waste water substantially free of suspended precipitate and practically exhausted of recoverable sucrose content, which waste water is discharged from the system.

The present invention possesses other objects and features of advantage, some of which, with the foregoing, will be set forth in the following detailed description. In the accompanying drawing, which is a flow-sheet diagrammatically indicating a system by which the invention may be practised, for the purpose of example there has been illustrated the best embodiment of the invention now known to us, but such embodiment is to be regarded as typical only of many possible embodiments, and the invention is not to be limited thereto.

Referring to the drawing, according to the preferred form of the invention sugar-beet molasses, indicated at 1, of substantially the composition previously described, i. e., of a density of about 80° to 85° Brix, is diluted with water from the supply 2 to produce a solution containing substantially 5 to 6 gms. of sucrose per 100 cc. of solution. The temperature of this solution is then adjusted to a point within the range of from 5° to 8° C. in a cold precipitation zone 3. To the cold solution powdered quicklime (CaO), substantially all minus 200 mesh, from a source 4, is added in incremental amounts up to a total sufficient to precipitate 90% of the sucrose content of the mixture. During this operation the mixture is maintained in a state of agitation and at a temperature substantially within the above mentioned range of from 5° to 8° C. The precipitation having been effected as just described, the amount of quicklime required per pound of sucrose precipitated will be found to be less than that usually required in past practise.

The above described cold precipitation reaction having been completed, the resulting cold saccharate mixture 5, comprising cold calcium saccharate precipitate and cold mother-liquor and having a temperature of from 6° to 10° C., is mixed in a warming zone 6 with a thickened sludge obtained, as via the flow-path 7, from a subsequent operation. This sludge, having a temperature of substantially 80° C., is composed of hot saccharate precipitate suspended in a quantity of hot mother-liquor and is added to the cold saccharate mixture in the proportion of approximately one volume of sludge to three or four volumes of the cold mixture to produce a filter-feed mixture 8 having a temperature of substantially from 30° to 35° C. In the event that the temperature of the mixture of the two products, i. e., the filter-feed 8, is, for any reason, below the prescribed range, or if a temperature above the preferred range be desirable, the temperature of said filter-feed mixture may be adjusted by the direct introduction of steam thereinto, as indicated at 9, or by the application of other suitable heating medium.

The filter-feed mixture 8 containing both the cold and the hot saccharate precipitates, its temperature having been adjusted as above described, is now subjected to separation by filtration, preferably in a rotary vacuum filter of the Oliver type indicated diagrammatically at 10. This operation produces a filter-cake, shown leaving the filtration stage, along the path 11, comprising a mixture of cold and hot calcium saccharate precipitates. In the filtration stage the cake is washed with warm water, preferably having a temperature of from 30° to 55° C., from the source 12. The warm wash water, it is found, exerts a highly efficient cleansing action in removing from the cake occluded mother-liquor and non-sugar impurities, so that the filter-cake recovered from the system along the path 11 will contain calcium saccharate of high purity which will yield an increased portion of its sucrose content in the form of marketable sugar.

The filtrate mother-liquor, from the above described separation substantially free from suspended solids, containing (in solution) substantially .5 gm. of sucrose and an alkalinity equivalent to approximately .7 gm. of CaO per 100 cc., and having a temperature of substantially from 30° to 35° C., leaves the filtration stage 10 and is conducted along the path 13 to a hot precipitation zone 14. In this zone the filtrate mother-liquor is heated to a temperature of substantially from 83° to 87° C. by the injection of steam thereinto from the source 15, or by the application thereto of other suitable heating medium. Such heating causes the precipitation of approximately 90% of the sucrose content of the filtrate mother-liquor in the form of hot calcium saccharate precipitate to produce a hot mixture of said precipitate suspended in hot mother-liquor.

Upon completion of the hot precipitation reaction the hot mixture leaves the hot precipitation zone 14 and is conducted along the path 16 to a hot thickening stage 17 wherein it is subjected to separation as by decantation thickening, care being taken to avoid loss of temperature. The thickening operation which is preferably carried out in a Dorr tray thickener, produces a hot slurry composed of substantially all of the hot succharate precipitate and approximately one-fourth of the hot mother-liquor present in the hot mixture, and a hot waste liquor amounting to approximately three-fourths of the hot mother-liquor, which waste liquor is substantially free from suspended precipitate and which seldom contains in solution more than .05 gm. of sucrose per 100 cc. The hot waste liquor is discarded from the process, as indicated in the drawing at 18, substantially stripped of recoverable sucrose content.

The hot slurry produced by the thickening operation, which, as hereinbefore pointed out, was formerly separately filtered to produce a cake containing only the hot calcium saccharate precipitate, is returned via the path 7 to the warming zone 6 wherein it is mixed with the cold saccharate mixture to produce the filter-feed mixture 8 in a subsequent cycle of the process, as hereinbefore described. By effecting the separation with decantation thickening and returning the hot calcium saccharate sludge to be filtered together with the cold calcium saccharate, the costly step, customarily used in past practise, of finally separately filtering the hot sludge to form a washed hot saccharate filter-cake, as such, is eliminated and the process simplified accordingly, since the filters customarily used to separate the cold saccharate precipitate in past practise have ample capacity for separating the mixed precipitates provided for in the present invention.

Contrary to previously held chemical views it is found, as a part of this invention, that in the mixing of the hot saccharate slurry with the cold saccharate mixture in the hereinbefore described warming step, the consequent substantial lowering of the temperature of the hot slurry does not operate to effect dissolution of the hot saccharate precipitate. As was hereinbefore mentioned, it is known that if the mixture of hot saccharate precipitate suspended in its own mother-liquor be cooled to points below 80° C. dissolution of the precipitate occurs. In such cases the calcium saccharate precipitate decomposes, the sucrose goes back into solution and most of the CaO is converted into calcium hydrate $Ca(OH)_2$. Thereafter no amount of heating will effect the reprecipitation of all of the decomposed saccharate. In mixing the hot saccharate slurry with the cold saccharate mixture, as taught by the present invention, this dissolution is not experienced. The reason for this is not well understood, but one possible explanation resides in the hypothesis that, since the solution phase of the filter-feed mixture resulting from the warming step contains an alkalinity equivalent to .7 gm. of CaO and a sucrose content equivalent to .5 gm. per 100 cc., the hot saccharate precipitate does not decompose, when suspended in it at temperatures of from 30° to 35° C., as would be the case were it cooled to a like temperature in its own mother-liquor which contains an alkalinity equivalent to approximately .4 gm. of CaO and a sucrose content equivalent to .05 gm. per 100 cc.

Thus it will be seen that there are numerous advantages flowing from the use of the present invention. Lower temperatures with consequent saving of lime are possible in the cold precipitation stage. Better separation is effected through filtering at higher temperatures. The heat of the returned hot saccharate sludge is utilized to adjust the temperature of the filter feed mixture, so that rarely is any additional heating equipment necessary. And of prime importance, the cold and hot saccharates are filtered together in one step, thus eliminating the customary "hot filters" and thereby effecting a considerable economy in equipment, space, labor and power consumption, and at the same time, as hereinbefore explained, obtaining an increase in the proportion of marketable sugar recovered.

In some instances it may be desirable to recover only the cold saccharate precipitate, discharging to waste the mother-liquor therefrom, and not carry out the hot saccharate precipitation steps. One aspect of the present invention is particularly applicable to an operation of that type. According to this aspect the molasses 1 are diluted with water from the supply 2 to form a solution containing substantially 5 to 6 gms. of sucrose per 100 cc. of solution. The temperature of the solution is then adjusted to within the range of from 5° to 8° C., in the cold precipitation zone 3, and maintained in that range while powdered quicklime (CaO) from the source 4 is added in incremental amounts up to the desired total, agitation of the mass being provided the while, all substantially as hereinbefore described. After the cold precipitation reaction is completed the resulting mixture of cold saccharate precipitate and cold mother-liquor, having a temperature of from 6° to 10° C., is conducted along the path 5 to the warming zone 6 wherein it is heated to a temperature of substantially from 30° to 35° C. by the direct introduction of steam thereinto from the supply 9, or by the application thereto of other suitable heating medium. In this phase of the invention, there being no hot precipitation steps, there is no hot saccharate sludge mixed with the cold saccharate precipitate mixture. The warm mixture passes from the warming zone along the path 8 as filter-feed for the filtration stage 10 and comprises the cold saccharate precipitate suspended in its mother-liquor and has a temperature of substantially from 30° to 35° C. In the filtration stage a separation is effected obtaining a filter-cake, recovered from the system via the path 11, containing the cold calcium saccharate precipitate which, after washing with warm water, preferably having a temperature from 30° to 55° C. from the source 12, is substantially free from mother-liquor. The filtrate mother-liquor from this separation leaves the filtration stage via the path 13 and, no further treatment of this liquor being contemplated, it is discharged to waste instead of being conducted to the hot precipitation zone as in a previously described form of the invention.

The modification of the invention just described makes possible decided advantages and economies in those installations practising only cold precipitation. In past practise it was considered impossible to realize the advantages of warm filtration coincidentally with the advantages to be obtained through cold (6° C.) precipitation. Such of the process chemistry as was known seemed to preclude such a possibility. It is found, however, as a part of this invention, that heating the mixture of cold precipitate and cold mother-liquor to temperatures of from 30° to 35° C. does not cause dissolution of the precipitate and does not seem to have any deleterious effect upon the same. This invention, therefore, makes it possible to effect a considerable saving in lime by conducting the precipitation at lower temperatures than those heretofore customarily employed, and to obtain a more effective separation by filtering at temperatures higher than those heretofore customarily used.

Another feature of the present invention of prime importance is the use of warm water, preferably at temperatures of substantially from 30° to 55° C., in washing the calcium saccharate filter-cake. This feature is not limited to its application in the hereinbefore described specific forms of the invention wherein warm water is used at the point 12 to wash the filter-cake produced from the cold saccharate mixture or from both the cold and hot saccharate mixtures. In and of itself it constitutes an important improvement in the Steffen process. It is discovered, as a part hereof, that warm water, within substantially the temperature range indicated, may be used for washing the filter-cake produced by cold-filtering the cold saccharate mixture in the cold filtering step of the customary Steffen procedure, and will result in improved washing efficiency, producing a cake which is freer of occluded mother-liquor and non-sugar impurities. In customary Steffen practise the cold saccharate mixture is filtered at temperatures of from 12° to 17° C. and the cake washed with water at substantially the same temperatures. Contrary to previously held views, it is found that this cake, produced by filtering at low temperatures, may be washed with warm water at temperatures of from 30° to 55° C. and there will be no dissolution of the saccharate precipitate, and an improved wash will be experienced.

In any form of the invention the filter-cake recovered from the process via the path 11 is subsequently treated by known procedure for the recovery of sugar in a crystalline, marketable form. The cake is mixed with water to form a slurry which is then treated with carbon-dioxide gas, resulting in the formation of precipitated calcium carbonate suspended in a solution of sucrose. This mixture is subjected to a separation operation, as by filtration, to produce a filter-cake comprising the calcium carbonate washed substantially free of sugar and a filtrate comprising a clear sugar solution. The calcium carbonate filter-cake is discarded from the system and the sugar solution is concentrated, as by evaporation of its water content, and its sucrose content largely recovered by means of crystallization. This operation yields a crystalline, marketable sugar and a final molasses containing such impurities as were present in the washed calcium saccharate filter-cake. In general terms, one pound of impurities in this cake will prevent the crystallization of one and one-half pounds of sucrose. Therefore, the greater the impurity content of the saccharate cake, the greater will be the amount of sugar lost in the final molasses. The present invention, in all of its forms, reduces this loss by producing, as hereinbefore explained, a calcium saccharate filter-cake having a minimum impurity content.

Thus, in its simplest form, a broad aspect of the invention comprises reacting lime with the sugar in a liquid aqueous solution of beet molasses while maintaining the temperature of the reacting mixture substantially below 35° C., according to known procedure in the Steffen cold saccharate process, then heating the mixture resulting from the reaction to a temperature relatively higher than that at which the reaction was effected but not above approximately 35° C., and finally separating the calcium saccharate precipitate from its mother liquor by filtering the mixture at the relatively higher temperature.

The claims of the present application are drawn to the invention as outlined in the foregoing paragraph, both broadly and specifically according to the detailed description. Claims to the equally novel improvements in the Steffen process which incldue the step of returning hot calcium saccharate precipitate and adding the same to the mixture of cold precipitate and cold mother-liquor resulting from the cold precipitation step will be found in our co-pending divisional application Serial No. 277,983.

While herein has been shown and described a system comprising a specific arrangement and kind of apparatus elements, and specific examples of methods of producing a desired product, it is to be understood that the invention is not limited to such specific system and methods but contemplates all such variants thereof as fairly fall within the scope of the appended claims.

What is claimed is:

1. Those steps in the treatment of beet molasses, which comprise reacting lime with the sugar in the solution while maintaining the temperature of the reacting mixture substantially below 35° C., heating the mixture resulting from said reaction to a temperature relatively higher than that at which the reaction was effected but not above approximately 35° C., and filtering the mixture at substantially said relatively higher temperature, said heating being realized by the direct introduction of steam into the mixture while passing to the filtering step.

2. The process of treating beet molasses which comprises reacting lime with a mixture of molasses and water while maintaining the reactants during precipitation at a temperature below substantially 30° C. for precipitating cold calcium saccharate, continually conducting a quantity of such cold precipitated saccharate in its mother liquor as filter-feed to a place of filtration, thereat separating by filtration the mother liquor and its precipitate while the temperature of the filter-feed during filtration is maintained at a temperature relatively higher than that at which the precipitation reaction was effected but not above approximately 35° C., maintaining such filtration temperature by the direct application of steam to the filter-feed for thus localizing the heating effects to the filter-feed and for avoiding excessive dilution thereof, heating such separated filtrate to precipitate hot calcium saccharate, and thickening the resulting suspension of precipitate for releasing clarified hot liquor by one path and thickened hot saccharate slurry by another.

ROY H. COTTRELL.
VERNAL JENSEN.